United States Patent [19]
Chao

[11] Patent Number: 5,805,259
[45] Date of Patent: Sep. 8, 1998

[54] RIMLESS EYEGLASSES HAVING ADJUSTABLE LEGS

[76] Inventor: David Yinkai Chao, No. 43-4, Yi Hsin Tsuen, Shui San Hsiang, Chia Yi Hsien, Taiwan

[21] Appl. No.: 856,339

[22] Filed: May 14, 1997

[51] Int. Cl.⁶ .............................. G02C 1/02; G02C 1/04; G02C 5/00
[52] U.S. Cl. .......................... 351/110; 351/106; 351/140
[58] Field of Search .............................. 351/110, 41, 106, 351/140, 124, 141, 86, 83

[56] References Cited

U.S. PATENT DOCUMENTS 3,846,017  11/1974  Ferrell ..................................... 351/106

*Primary Examiner*—Hung X. Dang

[57] ABSTRACT

A pair of eyeglasses includes a pair of lenses having a bridge member secured between the lenses and having two segments secured to the outer portions of the lenses with adhesive material for supporting legs and for allowing the segments to be secured to the lenses without drilling holes in the lenses. Two blocks each includes an end surface for adhering to the lenses and each includes an aperture for engaging with the extensions of the segments and for allowing the segments to be adjusted relative to the blocks and the lenses.

3 Claims, 2 Drawing Sheets

RIMLESS EYEGLASSES HAVING ADJUSTABLE LEGS

BACKGROUND OF THE INVENTION

1. Field of the Invention

The present invention relates to a pair of eyeglasses, and more particularly to a pair of rimless eyeglasses.

2. Description of the Prior Art

Typical rimless eyeglasses comprise two lenses having a bridge member secured between the lenses and having two legs secured to the lenses. However, the lenses of the typical rimless eyeglasses should be drilled with two or more holes for securing the legs. However, the drilling holes may greatly decrease the strength of the lenses and may cause the lenses to be easily broken. In addition, the leg portions that engaged in the holes of the lenses should be secured in place by fasteners, such as screws and nuts, which are directly engaged with the lenses and which may seriously damage and break the lenses. Furthermore, once the holes are drilled, the direction and the configuration of the hole may not be adjusted such that the direction of the legs may not be easily adjusted. The relative position between the lenses and the legs may not be precisely determined.

The present invention has arisen to mitigate and/or obviate the afore-described disadvantages of the conventional rimless eyeglasses.

SUMMARY OF THE INVENTION

The primary objective of the present invention is to provide a rimless eyeglasses in which the lenses are not required to be drilled with holes.

In accordance with one aspect of the invention, there is provided a pair of eyeglasses comprising a pair of lenses each including an inner portion and each including an outer portion, a bridge member secured between the inner portions of the lenses, and two segments secured to the outer portions of the lenses with adhesive material for supporting legs and for allowing the segments to be secured to the lenses without drilling holes in the lenses.

Two blocks each includes an end surface for engaging with the outer portions of the lenses and for adhering to the lenses, the blocks each includes an aperture, the segments each includes an extension engaged in the aperture of the block, and means for securing the extension to the block.

The blocks each includes a screw hole intersecting with the aperture, and the securing means includes a screw for engaging with the screw hole and for engaging with the extension of the segment and for securing the segment to the block.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
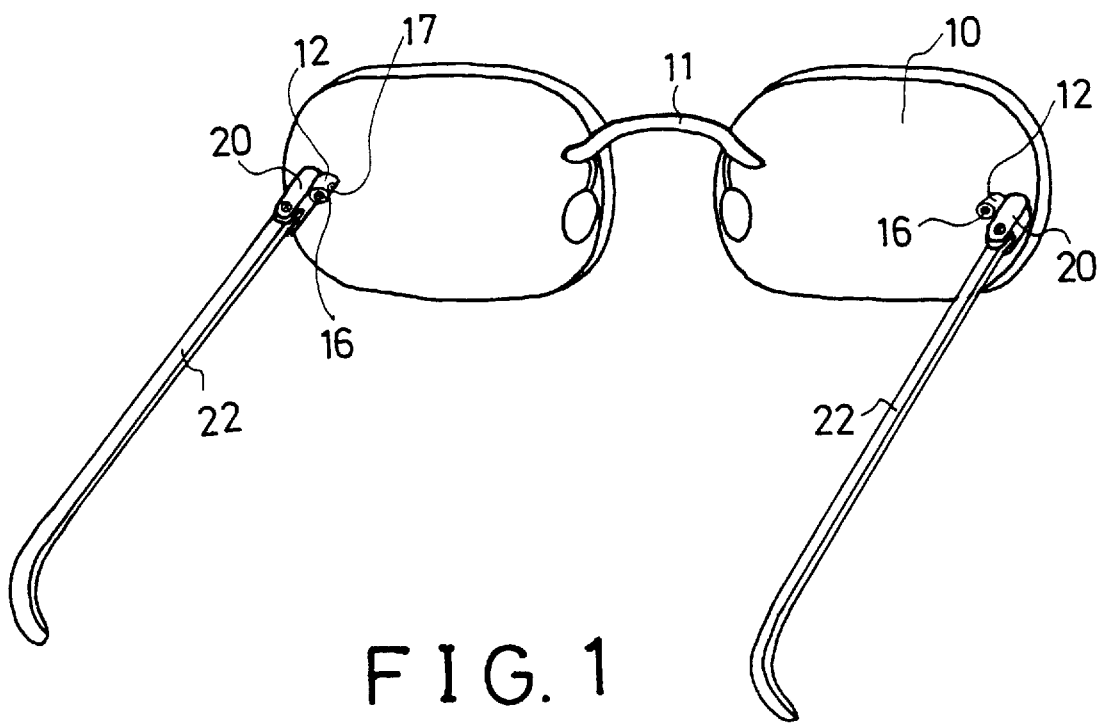
FIG. 1 is a perspective view of a pair of rimless eyeglasses in accordance with the present invention.
Figure 2:
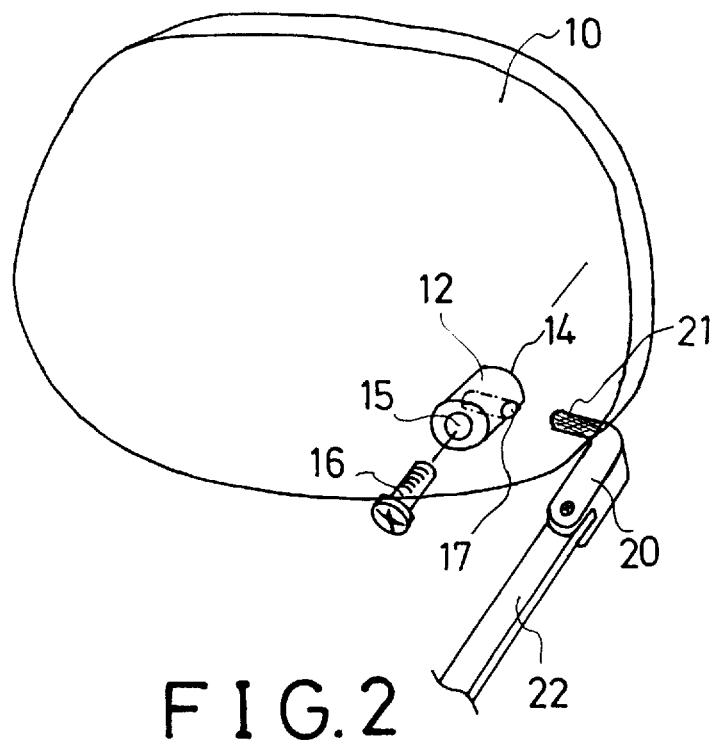
FIG. 2 is a partial exploded view of the rimless eyeglasses.

Referring to the drawings, and initially to FIGS. 1 and 2, a pair of rimless eyeglasses in accordance with the present invention comprises two lenses 10, and a bridge member 11 secured between the inner portions of the lenses. Two blocks 12 each has an end surface 14 for securing to the outer portions of the lenses 10 and each has a screw hole 15 perpendicular to the end surface 14 for engaging with a fastener 16 and each has a lateral aperture 17 intersecting with the screw hole 15. Two segments 20 each includes an extension 21 for engaging in the lateral aperture 17 of the block 12 and for securing to the block 12 by the fastener 16. The segments 20 are provided for supporting the legs 22. The bridge member 11 and the blocks 12 may be secured to the lenses 10 by adhesive materials, such as epoxy, quick adhesive etc. The bridge member 11 preferably include two end surfaces for solidly securing to the lenses. The end surface 14 may include a flat surface or a curved surface which corresponds to that of the outer portions of the lenses 10, for allowing the blocks 12 to be solidly and stably secured to the lenses 10.

It is to be noted that the extension 21 may be slided relative to the block 12 along the aperture 17 and may be rotated relative to the block 12 about the axis of the extension 21 such that the segments 20 may be adjusted to the best relative position relative to the lenses 10. In addition, the lenses 10 are not required to be drilled with holes such that the strength of the lenses 10 will not be decreased.

Alternatively, the block 12 and the segment 20 may be secured together as an integral member and may be directly adhered to the lenses 10.

Figure 4:
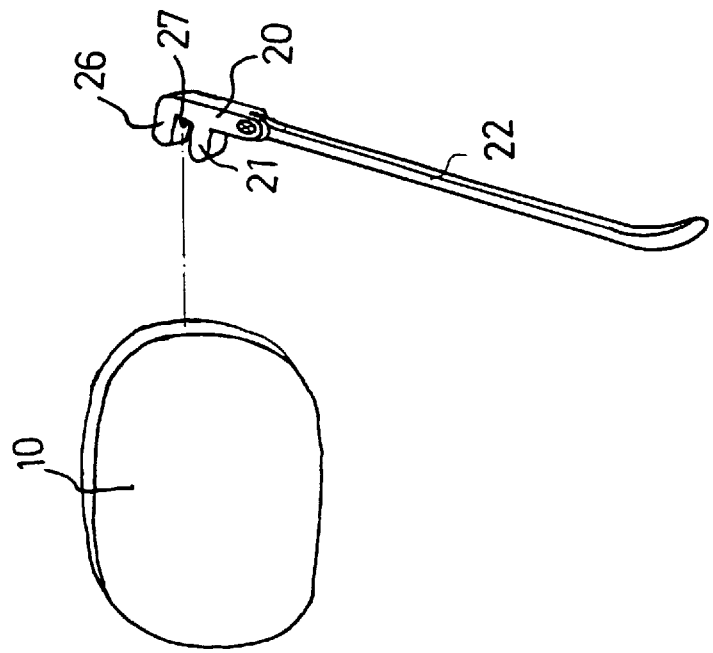
FIGS. 3 and 4 are perspective views illustrating the applications of the rimless eyeglasses.
Figure 3:
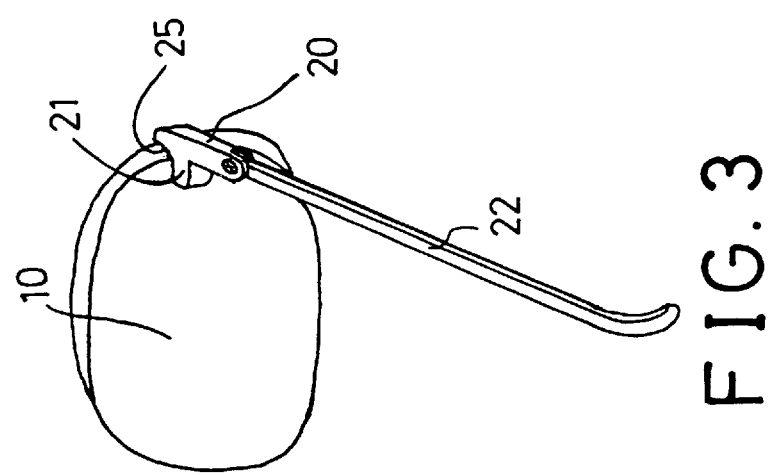

Referring next to FIG. 3, the segment 20 may include a notch 25 formed in the root portion of the extension 21 for directly securing to the lenses 10 by adhesive material and for increasing the adhering area between the lenses 10 and the segments 20. As shown in FIG. 4, the segment 20 may include another extension 26 parallel to the extension 21 for defining a groove 27 and for engaging with the lenses and for allowing the extensions 21, 26 to engage with the rear and the front surfaces of the lenses and for allowing the segment 20 to be solidly secured to the lenses 10 by adhesive material.

Accordingly, the rimless eyeglasses in accordance with the present invention include a pair of lenses that are not required to be drilled with holes for engaging with the legs or segments and for preventing the strength of the lenses from being decreased.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pair of eyeglasses comprising:

a pair of lenses each including an inner portion and each including an outer portion, a bridge member secured between said inner portions of said lenses, two blocks each including an end surface for engaging with said outer portions of said lenses and for adhering to said lenses, two segments for securing to said blocks respectively and for supporting legs and for allowing said segments to be secured to said lenses without drilling holes in said lenses, and means for adjusting said segments relative to said blocks respectively.

2. A pair of eyeglasses according to claim 1, wherein said blocks each includes an aperture, said segments each includes an extension engaged in said aperture of said block for allowing said segment to be adjusted relative to said block, and means for securing said extension to said block.

3. A pair of eyeglasses according to claim 2, wherein said blocks each includes a screw hole intersecting with said aperture, and said securing means includes a screw for engaging with said screw hole and for engaging with said extension of said segment and for securing said segment to said block.

* * * * *